United States Patent
Hoshi et al.

(10) Patent No.: US 6,812,447 B2
(45) Date of Patent: Nov. 2, 2004

(54) IMAGE PICKUP APPARATUS HAVING A WAVE SYNTHESIZER FOR INCIDENT AND REFERENCE LIGHT

(75) Inventors: Hiroaki Hoshi, Kanagawa (JP); Tsunefumi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/916,472

(22) Filed: Jul. 30, 2001

(65) Prior Publication Data

US 2002/0033441 A1 Mar. 21, 2002

(30) Foreign Application Priority Data

Aug. 1, 2000 (JP) ........................................ 2000-233649

(51) Int. Cl.[7] .............................................. H01L 27/00
(52) U.S. Cl. ..................... 250/208.1; 356/484; 250/216
(58) Field of Search ............................. 250/208.1, 216, 250/108.2; 356/477, 478, 484, 485

(56) References Cited

U.S. PATENT DOCUMENTS

| | | | |
|---|---|---|---|
| 3,746,454 A | * 7/1973 | Pace et al. | ............. 356/139.08 |
| 5,353,109 A | * 10/1994 | Langdon et al. | ............. 356/484 |
| 5,450,223 A | * 9/1995 | Wagner et al. | ............... 359/124 |
| 5,463,461 A | * 10/1995 | Horiuchi et al. | ............. 356/484 |
| 5,485,009 A | * 1/1996 | Meyzonnetie et al. | ...... 356/5.09 |
| 5,555,087 A | * 9/1996 | Miyagawa et al. | ......... 356/485 |
| 5,610,705 A | * 3/1997 | Brosnan et al. | ............. 356/28.5 |
| 6,356,657 B1 | * 3/2002 | Takaoka et al. | ............. 382/197 |

* cited by examiner

*Primary Examiner*—Thanh X. Luu
(74) *Attorney, Agent, or Firm*—Fitzpatrick, Cella, Harper & Scinto

(57) ABSTRACT

In order to detect the amplitude and phase of object light with a high SNR, an image pickup apparatus includes an image pickup unit having semiconductor photodetection elements arrayed two-dimensionally, a light-emitting element unit for emitting reference light having a predetermined frequency difference with respect to the frequency of light incident on the image pickup unit, and a wave synthesizer for synthesizing the incident light with the reference light from the light-emitting element unit and guiding the resultant light to the image pickup unit.

3 Claims, 3 Drawing Sheets

IMAGE PICKUP APPARATUS HAVING A WAVE SYNTHESIZER FOR INCIDENT AND REFERENCE LIGHT

BACKGROUND OF THE INVENTION

1. Field of the Invention

The present invention relates to an image pickup apparatus for picking up an image of an object.

2. Related Background Art

Various kinds of image pickup elements such as a CCD and CMOS and image pickup apparatuses using them have been proposed.

These image pickup apparatuses are designed to guide external light scattered by an object to an image pickup element through an imaging lens system. The only way to compensate for an insufficient light amount is to cause an additional light source such as an electronic flash to emit/project light onto the object. If such a light source is added to an image pickup apparatus internally or externally, the size and weight of the apparatus undesirably increase.

In addition, a conventional apparatus has only the simplest function of picking up a two-dimensional image of an object, and hence can obtain only a simple image picked up by this function. However, this apparatus cannot obtain physical information about the object from light reflected by the object.

The physical information about the object is acquired by another device designed to irradiate the object with light from a special light source such as a laser, detect light reflected by the object as object light, and measure it with a so-called light measuring device. In addition, such a light measuring device is designed to mainly perform point or line measurement. To obtain two-dimensional or three-dimensional information, therefore, a scanning means is additionally required. When, for example, three-dimensional information is to be obtained, an object on a rotating table must be rotated about a stationary shaft or the measuring device must be moved around the object to scan the entire surface of the object. This imposes severe restrictions on the object. To make information obtained in this manner conform to images obtained by a conventional image pickup apparatus, there are still many technical hurdles to surmount. Under the circumstances, few apparatuses have been put into practice.

SUMMARY OF THE INVENTION

It is an object of the present invention to provide an image pickup apparatus which can detect the amplitude and phase of light from an object with a high SNR (Signal to Noise Ratio), attain reductions in its size and power consumption, and capture the physical properties of the object by image pickup operation under weak light.

In order to achieve the above object, according to aspect of the present invention, there is provided an image pickup apparatus comprising an image pickup unit having an array of a plurality of photodetection elements, a light-emitting element unit for emitting reference light having a predetermined frequency difference with respect to a frequency of light incident on the image pickup unit, and a wave synthesizer for synthesizing the incident light and the reference light from the light-emitting element unit and guiding the synthesized light to the image pickup unit.

The other objects and features of the present invention will be apparent from the following detailed description in conjunction with the accompanying drawings.

DETAILED DESCRIPTION OF THE PREFERRED EMBODIMENTS

Figure 1:
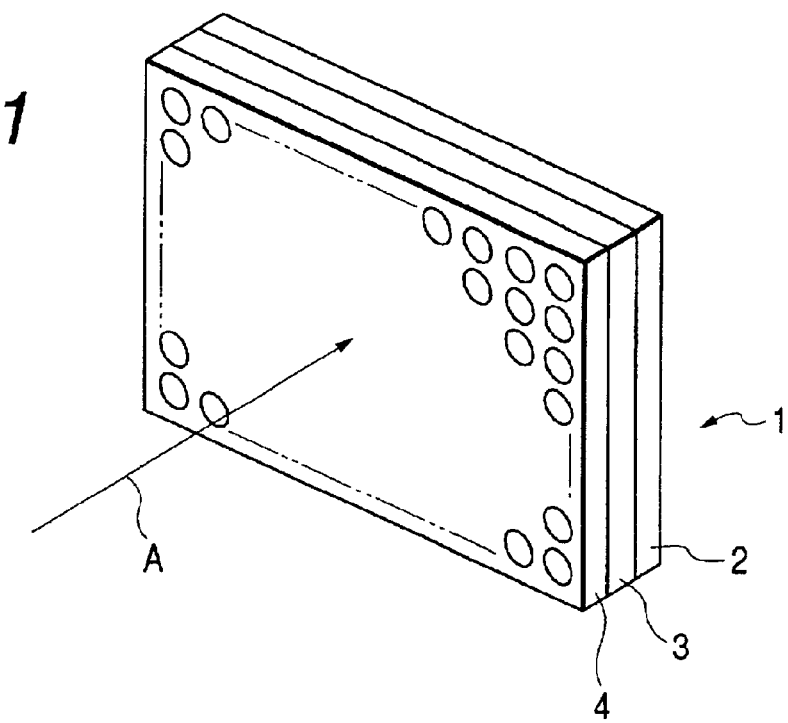
FIG. 1 is a perspective view for explaining the first embodiment of the present invention.

The embodiments of the present invention will be described in detail below with reference to the accompanying drawings. FIG. 1 is a perspective view showing an example of an integrated image pickup element according to the first embodiment of the present invention.

Referring to FIG. 1, an integrated image pickup element 1 is comprised of a CMOS unit 2 in which CMOS-based two-dimensional photosensors and circuits such as an amplifier (to be described later) are integrated, a local emitting unit 3 constituted by a semiconductor laser (to be abbreviated as LD hereinafter) and wave synthesizer, and a two-dimensional microlens array 4.

The CMOS unit 2 in which circuits are integrated can be formed on an Si wafer by a normal CMOS process. The local emitting unit 3 can be formed by integrating a wave synthesizer having a waveguide structure on a compound semiconductor base such as GaAlAs or InAlp and an LD. The microlens array 4 can be formed from an optical-glass-based material.

Figure 2:
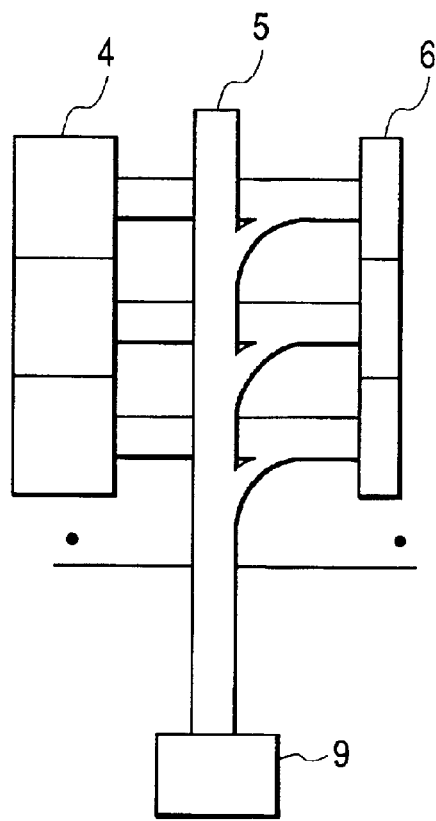
FIG. 2 is a view for explaining the first embodiment of the present invention.

Light strikes the image pickup element 1 through a normal imaging optical system from a direction A in FIG. 1. The respective lenses of the microlens array 4 are arranged so as to correspond to the respective optical sensors of the CMOS unit 2 one-to-one. Light incident on the microlens array 4 is guided to the local emitting unit 3. The local emitting unit 3 has one wave synthesizer which is provided in common to each of the pairs of lenses of the microlens array 4 and sensors of the CMOS unit 2, and also has one common LD serving as a local emitting light source. FIG. 2 shows the structure of the local emitting unit 3 in one-dimensional direction. Referring to FIG. 2, object light from the microlens array 4 is guided through the wave synthesizer 5 formed by a waveguide and incident on each sensor of a CMOS unit 6 which corresponds to each of the lenses of the microlens array 4 one-to-one. Reference light from a local emitting LD 9 serving as a local emitting unit is branched/guided and incident on each sensor of the CMOS unit 6 through the wave synthesizer 5. In this manner, the light guided as object light from the microlens array 4 is synthesized with local emitted light serving as reference light from the LD at each predetermined optical sensor position. The synthesized light is brought into interference. The intensity of the interference light is input into each optical sensor to be photoelectrically converted. The interference light converted into carriers is amplified by each sensor of the CMOS unit and subjected to electrical frequency filtering. As a consequence, only a signal in a frequency band corresponding to the difference in frequency between the object light and the reference light is extracted.

This frequency difference is called a beat frequency, which serves as a fundamental frequency for so-called heterodyne detection (reference: Amnon Yariv, "INTRODUCTION TO OPTICAL ELECTRONICS", translated by Kunio Tada and Takeshi Mamiya, MARUZEN CO., LTD.; Amnon Yariv, "INTRODUCTION TO OPTICAL ELECTRONICS", Holt, Rinehart and Winston, Inc). By analyzing the amplitude and phase of the beat frequency signal, the amplitude and phase of the object light can be obtained. One merit of heterodyne detection is that an increase in SNR can be attained by reducing the frequency band to the beat frequency band. In addition, an increase in SNR can be attained by setting the beat frequency in a band in which little noise occurs. In addition, the SNR can be increased to a so-called shot noise limit by increasing the intensity of local emitted light. This produces a great effect in detection of weak light dominated by thermal noise.

To stabilize the beat frequency, the deviation amount of the extracted beat frequency is fed back to the LD through the LD driver to change the frequency of the LD in accordance with the deviation. In a conventional heterodyne/homodyne detection method, reference light is split from an object light source and synthesized with the object light to bring them into interference in front of an optical sensor. In contrast to this, in this embodiment, since reference light is prepared independently and its frequency, amplitude, and phase can be controlled as needed, parameters such as a frequency difference and reference light intensity can be optimized.

The signal detected in this manner exhibits a high SNR and has information about the intensity (amplitude) and phase of light from the object. This makes it possible to obtain not only a general intensity image but also a phase image. In this embodiment, the size of an image pickup element can be reduced. In addition, the step for assembly adjustment and the like can be omitted, and hence a reduction in cost can be expected as compared with a case where the respective members are arranged independently.

This embodiment has exemplified the case where heterodyne detection is used. Obviously, however, in a system dominated by thermal noise, a sufficient increase in SNR can be expected even by so-called homodyne detection, in which the frequency of object light is equal to that of reference light, as long as a shot noise limit can be achieved. In this embodiment, homodyne detection can be realized by only setting the beat frequency to 0 and shifting the band of the LPF. In this case as well, great effects can be obtained by arranging a local emitting unit, which is the gist of this embodiment, on the detection side. If homodyne detection is regarded as heterodyne detection where the beat frequency is 0, it is obvious that this embodiment includes homodyne detection.

The above embodiment has exemplified the case where the beat frequency is stabilized to a constant value. Depending on the noise band of the SNR, image pickup operation with a high SNR can be realized by modulating and controlling the beat frequency itself. This can be realized by detecting the beat frequency and controlling it to a desired frequency, i.e., adding the function of shifting a reference signal to the arrangement for beat frequency stabilization according to the above embodiment. Assume that it is found that the SNR in an initial band has decreased due to a change in temperature or an electromagnetic wave environment, resulting in a deterioration in image quality. In this case, the band can be shifted. In addition, by optimally setting a modulation frequency for a beat frequency in accordance with such external disturbance and fluctuating frequency, frequency separation can be performed with respect to external influences, and hence image pickup operation with a high SNR can be realized.

Figure 3:
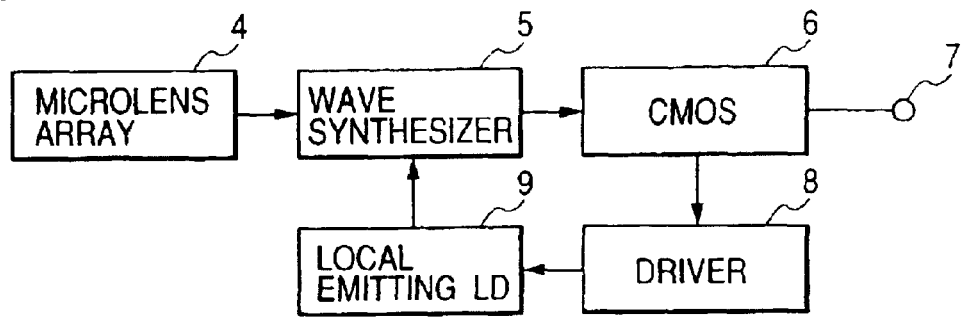
FIG. 3 is a block diagram for explaining the second embodiment of the present invention.

FIG. 3 shows the second embodiment of the present invention.

FIG. 3 is a block diagram showing the arrangement of an embodiment formed without increasing the degree of integration as compared with the first embodiment. The same reference numerals as in FIG. 1 denote the same parts in FIG. 1.

Referring to FIG. 3, this arrangement includes a microlens array 4, a wave synthesizer 5, a CMOS unit 6 having a two-dimensional array of optical sensors, an output terminal 7, an LD driver 8, and a local emitting LD 9.

This embodiment indicates that the present invention can be practiced even by combining discrete elements. More specifically, object light is incident from a direction A. The wave synthesizer 5 in the form of a waveguide made of an optical glass or optical plastic material is disposed behind the general microlens array 4 in contact therewith to synthesize reference light from the local emitting LD 9 with the object light so as to bring them into interference. The resultant interference light is then incident on each optical sensor area of the CMOS portion 6 formed by integrating an amplifier, BPF (band-pass filter), and the like. In addition, the driver 8 for the single LD 9 may be prepared as a discrete element and detachably mounted on the above arrangement.

This arrangement formed by combining these discrete elements can attain the same function as that of the first embodiment described above. This indicates that the present invention can be practiced even if an integration technique like that in the first embodiment cannot be realized.

Figure 4:
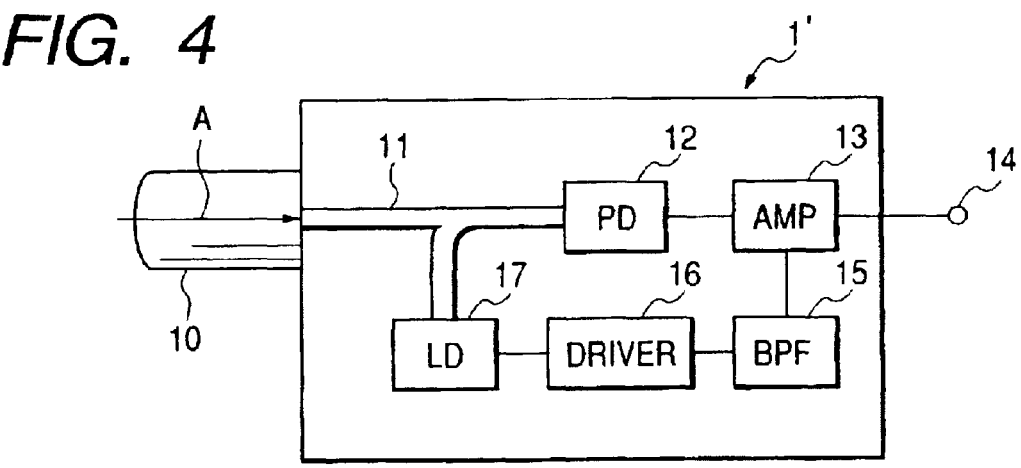
FIG. 4 is a view for explaining the third embodiment of the present invention.

FIG. 4 shows the third embodiment of the present invention.

FIG. 4 is a block diagram showing an embodiment in which the integration degree is higher than that of the arrangement of the first embodiment. The same reference numerals as in FIG. 1 denote the same part in FIG. 4.

Referring to FIG. 4, this arrangement includes a microlens 10 of a microlens array which corresponds to one pixel 1', an optical wave synthesizer 11 of a waveguide type, an optical sensor unit 12, an amplifier 13, an output terminal 14, a band-pass filter (BPF) 15, an LD driver 16, and a local emitting LD 17. One pixel 1' is formed by integration.

Such an element can be formed by integrating the optical wave synthesizer 11, optical sensor unit 12, amplifier 13, band-pass filter 15, and LD driver 16 on an Si wafer by a CMOS process. A multiple quantum well structure is formed as a lattice distortion reducing mechanism on the Si wafer, and an LD made of a compound semiconductor is further integrated with this structure to form such the element.

Figure 5:
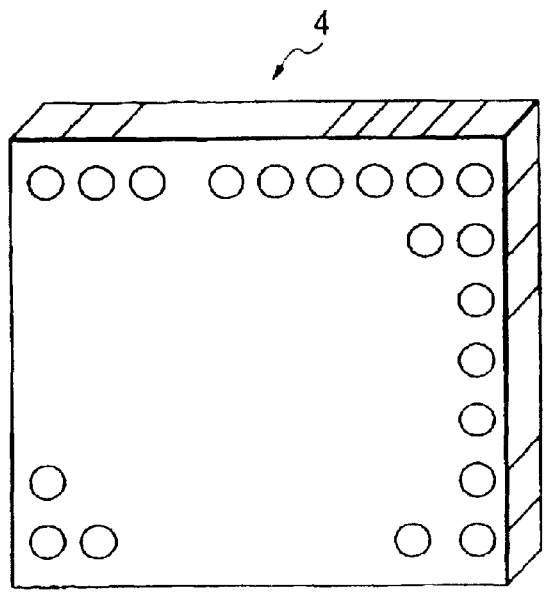
FIG. 5 is a perspective view for explaining the third embodiment of the present invention.

As shown in FIG. 5, if such the elements arranged in a two-dimensional array are integrated, a more compact arrangement can be realized, and a reduction in power consumption can be attained. In addition, the step for assembly adjustment can be omitted.

Figure 6:
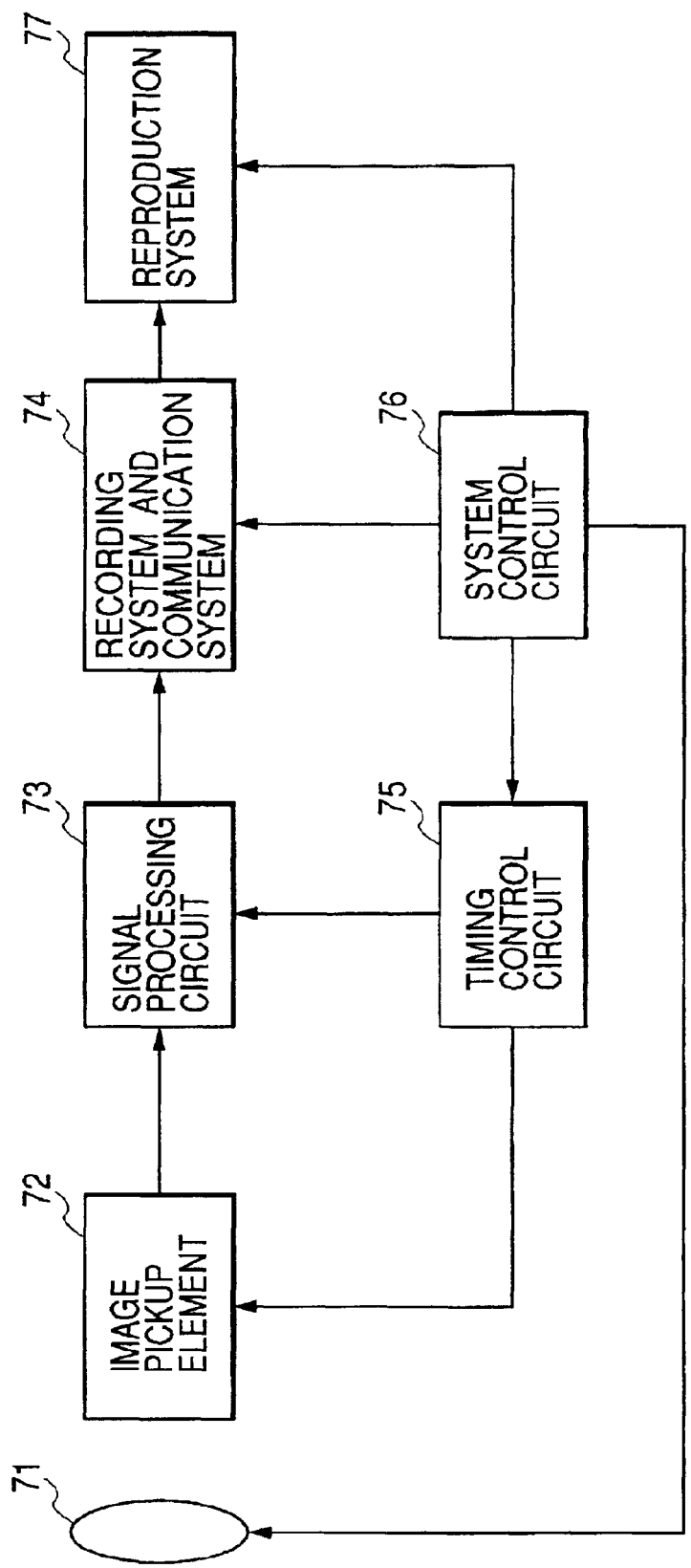
FIG. 6 is a block diagram showing an image pickup apparatus using the image pickup elements according to the first to third embodiments.

FIG. 6 is a schematic view of an image pickup apparatus using the above image pickup element. As shown in FIG. 6, object light incident through an optical system 71 is focused on an image pickup element 72. A light signal is converted into an electrical signal by a pixel array arranged on the image pickup element 72. This electrical signal is processed by a signal processing circuit 73 to obtain the amplitude, phase, and the like of the object light, as described above. This signal is also subjected to signal conversion processing by a predetermined method, e.g., white balance correction, gamma correction, luminance signal formation, color signal formation, or contour correction processing. The resultant signal is output. The signal having undergone such signal processing is recorded or transferred by a recording system and communication system 74. The signal that is recorded or transferred is reproduced by a reproduction system 77. The image pickup element 72 and signal processing circuit 73 are controlled by a timing control circuit 75. The optical system 71, timing control circuit 75, recording system and communication system 74, and reproduction system 77 are controlled by a system control circuit 76.

An image pickup apparatus having a compound eye arrangement can be formed by arranging a plurality of image pickup elements into a predetermined array. If, for example, two image pickup elements are spaced apart from each other by a predetermined distance (baseline length), a so-called stereoscopic image pickup apparatus can be formed. Since a stereoscopic image can be obtained depending on the angle of convergence and baseline length defined by the two image pickup elements, three-dimensional information about a stereoscopic object can be quickly obtained.

As has been described above, according to this embodiment, there is provided an image pickup apparatus which can detect the amplitude and phase of object light with a high SNR, attain reductions in size and power consumption, and capture the physical properties of the object by image pickup operation under weak light.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

an image pickup unit having an array of a plurality of photodetection elements;

a light-emitting element unit for emitting reference light having a predetermined frequency;

a wave synthesizer for synthesizing image light from an object and the reference light from said light-emitting element unit, and for guiding the synthesized light to said image pickup unit; and a filter for extracting a difference frequency between a frequency of the light from the object and said frequency of the reference light, from outputs of said plurality of photodetection elements of said image pickup unit, wherein said light-emitting element unit changes said predetermined frequency of the reference light in accordance with said difference frequency extracted by said filter, so that said difference frequency becomes 0.

2. An image pickup apparatus comprising:

an image pickup unit having an array of a plurality of photodetection elements;

a microlens array provided for each of the photodetection elements;

a light-emitting element unit for emitting reference light having a predetermined frequency;

a wave synthesizer for synthesizing image light from an object and the reference light from said light-emitting element unit, and for guiding the synthesized light to said image pickup unit; and a filter for extracting a difference frequency between a frequency of the light from the object and said frequency of the reference light, from outputs of said plurality of photodetection elements of said image pickup unit, wherein said light-emitting element unit changes said predetermined frequency of the reference light in accordance with said difference frequency extracted by said filter.

3. An image pickup apparatus comprising:

an image pickup unit having an array of a plurality of photodetection elements;

a light-emitting element unit for emitting reference light having a predetermined frequency;

a wave synthesizer for synthesizing image light from an object and the reference light from said light-emitting element unit, and for guiding the synthesized light to said image pickup unit, wherein said wave synthesizer comprises a light waveguide provided for each of the photodetection elements; and a filter for extracting a difference frequency between a frequency of the light from the object and said frequency of the reference light, from outputs of said plurality of photodetection elements of said image pickup unit, wherein said light-emitting element unit changes said predetermined frequency of the reference light in accordance with said difference frequency extracted by said filter.

* * * * *